July 7, 1959
J. R. SNYDER
2,893,686
VALVE WASHER
Filed Feb. 1, 1955
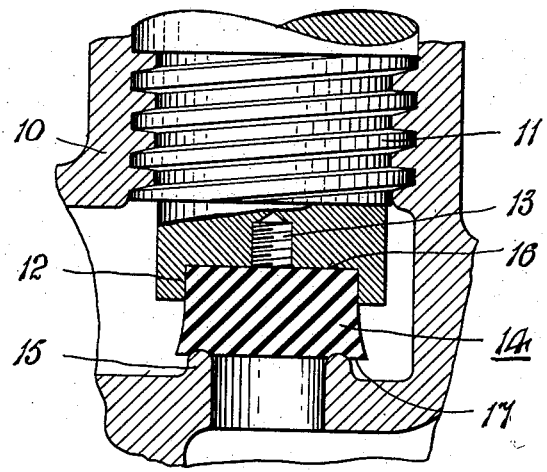
Fig. 1.
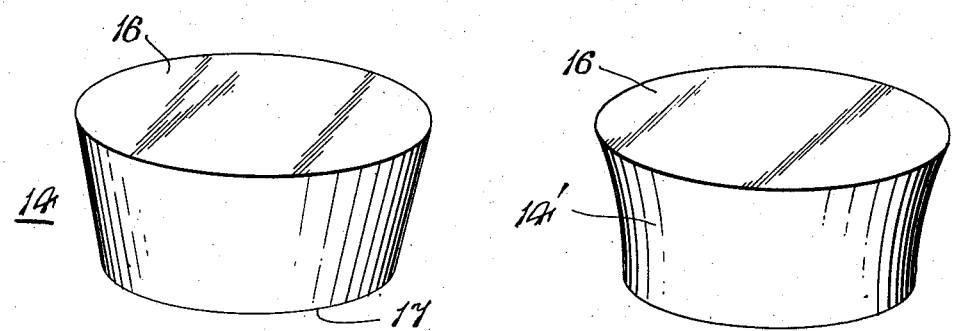
Fig. 3.
Fig. 2.
INVENTOR.
John Snyder
BY
Stanley Lightfoot
Attorney United States Patent Office 2,893,686
Patented July 7, 1959

2,893,686
VALVE WASHER
John R. Snyder, Detroit, Mich.
Application February 1, 1955, Serial No. 485,467
2 Claims. (Cl. 251—357)

This invention relates to valves and faucets, and more particularly to the sealing washers thereof by means of which efficient closure of the valve on its seat is effected when such a washer of rubber or rubber-like material is utilized as the seating element. The washer is usually secured to the spindle by means of a central set screw, or in other cases by being set in a socket in the end of the valve spindle, in which case the annular wall of the socket is provided with an inturned lip extending over the outer edge of the washer or engaging a suitably formed shoulder on the washer.

The use of a central set screw reduces flexibility of washer, often becomes corroded and permits leakage through central orifice and around back of washer even to the extent of resulting in erosion and corrosion of the valve spindle socket thus rendering it unfit for further use.

The present invention contemplates the use of a washer of resilient rubber, or rubber-like material, of a unique form wherein its periphery is characterized by being of greater diameter on the outer and on the inner face of the washer than through the body portion intermediate of these faces. This may be described roughly as being of hour-glass form in which the washer has a distinct "waist" intermediate of the thickness of the washer. The said washer may be otherwise described as being tapered from both ends toward the medial portion thereof.

The said improved washer is intended to be inserted in the cylindrical socket at the end of the valve spindle (such as a replacement for the usual perforated washer ordinarily secured in place by a central set screw).

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawings, wherein:

Figure 1 is a sectional elevation of a faucet illustrating my improved washer as inserted in the socketed end of the spindle thereon;

Figure 2 is a perspective detail view of the improved washer removed; and

Figure 3 is a vertical cross sectional view of a modified form of washer.

Similar characters of reference indicate similar parts of the several figures of the drawing.

Figure 1 illustrates a faucet 10 having the usual retractable spindle 11, recessed, or counterbored, at 12 to receive a valve-closing washer. This washer is usually centrally perforated and secured in the recess 12 of the valve spindle by means of a central set screw engaging a threaded bore 13 provided in the said spindle. This type of centrally perforated washer I propose to replace with a special washer 14 having characteristics which will be hereinafter explained. 15 indicates the annular seat upon which the washer impinges when the valve is closed.

The preferred form of this replacement washer 14 (which may, however, be original equipment for such valves) is illustrated in Figure 2, from which it will be noted that the washer is of a somewhat "hour-glass" formation in edgewise elevation being somewhat flared on the inner face 16 and on the outer face 17; the said washer 14 being reduced in diameter intermediate of the said inner and outer faces.

It is intended that the normal diameter of one or both ends of the said washer be somewhat greater than the diameter of the socket 12 of the valve stem, whereby the flared rim of the washer may be radially compressed to enter the said socket and, upon being fully entered into the socket, will expand not merely radially against the annular wall of the recess 12, throughout the depth of the said wall 12, but will exert a powerful angularly directed holding force directed toward the juncture between said annular wall and the base of the socket as a result of the greater compression effected on the inserted rim of the washer as related to the tapering body portion thereof remote from the said rim.

As stated, it is preferred that the area of one face of the washer be somewhat greater than the other face thereof and that both of these faces be of greater diameter than the intermediate body of the washer; whereby to afford selection of one or other of these faces as that to be inserted in the socket of the valve spindle, in order to meet such slight variations in diameter of the socket as may be encountered.

However, where no selectivity as to which end of the washer is to be inserted in the socket of the valve stem is required, a modified form of the washer such as that shown in Figure 3 may be utilized; Figure 3 showing the washer 14' as being flared at the upper end 16 only with its side wall tapered downwardly toward the lower end of the washer which is simply smaller than the upper end but is not flared.

Such a washer as described does not have the same tendency to slip or eject itself from a more or less shallow recess, as does a plain cylindrical washer wherein no such tapered rim is provided, nor does it require a formation of an inturned rim within or on the edge of the socket as a means of retaining the washer in place.

Furthermore, as such a washer may be safely inserted into a relatively shallow socket, a greater proportion of free washer may extend outwardly of the socket admitting of both a coaxial and a rotary flexibility which greatly enhances the watertight impinging engagement of the free face of the washer with the valve seat. Still further, where the washer is flared at both upper and lower ends as suggested, this flaring provides a still further flexibility in the free or outer rim portion of the washer which adds to the coaxial and rotary flexibility of that portion of the washer which engages the valve seat as compared with a plain cylindrical washer of similar proportions.

Herein, and in the claims, it is intended that the use of the term rubber-like material be deemed as descriptive of the elastic and flexible characteristics of rubber, and not the actual composition of the material, as will be readily recognized.

This invention may be developed within the scope of the following claims without departing from the essential features of the said invention, and it is desired that the specification and drawings be read as being merely illustrative of a practical embodiment of the same and not in strictly limiting sense.

What I claim is:

1. In combination with a valve spindle having a washer-receiving recess with said recess in turn being defined by a generally planar cylindrical peripheral wall, a valve washer snugly mounted in said recess, said valve washer comprising a disc element of rubber-like material, the opposing end faces of said disc element being of a preformed larger diameter than the medial portion of the disc element and the side wall of said disc element being tapered inwardly from both of the said faces towards the said medial portion of the said disc element, said disc faces being of larger diameter than said recess, and one of the faces of the disc element being in immediate contact with the bottom wall of said recess when the disc element is emplaced in the spindle recess.

2. In combination with a valve spindle having a washer-receiving recess therein, a valve washer, said valve washer comprising a disc element of rubber-like material, the opposing faces of said disc element being preformed of a larger diameter than the medial portion of the disc element but of different diameters with respect to each other, the side wall of said disc element tapering inwardly from both of said faces towards the medial portion of said disc element, and the face of said disc element which is in immediate contact with the bottom of said valve spindle recess also being of larger diameter than the said recess.

References Cited in the file of this patent

UNITED STATES PATENTS

| | | |
|---|---|---|
| 136,851 | Montgomery | Mar. 18, 1873 |
| 663,607 | Lynch | Dec. 11, 1900 |
| 1,173,538 | Roberts | Feb. 29, 1916 |
| 1,211,595 | Kimmey et al. | Jan. 9, 1917 |
| 1,860,350 | Lawrence | May 31, 1932 |
| 2,146,382 | Rice | Feb. 7, 1939 |
| 2,216,459 | Siclari | Oct. 1, 1940 |
| 2,449,290 | Gavriles | Sept. 14, 1948 |
| 2,617,621 | Hobbs | Nov. 11, 1952 |
| 2,717,757 | Bowlzer | Sept. 13, 1955 |

FOREIGN PATENTS

| | | |
|---|---|---|
| 527,140 | Great Britain | Oct. 2, 1940 |
| 686,404 | Great Britain | Jan. 21, 1953 |
| 1,087,474 | France | Aug. 25, 1954 |